US008347358B2

(12) United States Patent
Buch et al.

(10) Patent No.: US 8,347,358 B2
(45) Date of Patent: *Jan. 1, 2013

(54) OPEN ENHANCED FEDERATION SECURITY TECHNIQUES

(75) Inventors: Jeremy T. Buch, Boulder, CO (US); Michael Trommsdorff, Zurich (CH); James Undery, Boulder, CO (US)

(73) Assignee: Microsoft Corporation, Redmond, WA (US)

( * ) Notice: Subject to any disclaimer, the term of this patent is extended or adjusted under 35 U.S.C. 154(b) by 1059 days.

This patent is subject to a terminal disclaimer.

(21) Appl. No.: 11/821,605

(22) Filed: Jun. 25, 2007

(65) Prior Publication Data

US 2008/0320565 A1 Dec. 25, 2008

(51) Int. Cl.
*G06F 7/04* (2006.01)
(52) U.S. Cl. .......................................................... 726/4
(58) Field of Classification Search ................... 726/4
See application file for complete search history.

(56) References Cited

U.S. PATENT DOCUMENTS

| 6,304,892 | B1 | 10/2001 | Bhoj et al. | |
|---|---|---|---|---|
| 7,194,547 | B2 | 3/2007 | Moreh et al. | |
| 7,441,429 | B1 * | 10/2008 | Nucci et al. | 70/229 |
| 2004/0128542 | A1 | 7/2004 | Blakley, III et al. | |
| 2004/0205188 | A1 * | 10/2004 | Ahlard et al. | 709/224 |
| 2005/0021649 | A1 * | 1/2005 | Goodman et al. | 709/207 |
| 2005/0060337 | A1 | 3/2005 | Chou et al. | |
| 2005/0183137 | A1 * | 8/2005 | Jooste | 726/4 |
| 2005/0188212 | A1 | 8/2005 | Laferriere et al. | |
| 2005/0188423 | A1 * | 8/2005 | Motsinger et al. | 726/22 |
| 2006/0021018 | A1 | 1/2006 | Hinton et al. | |
| 2006/0123472 | A1 | 6/2006 | Schmidt et al. | |
| 2006/0136990 | A1 | 6/2006 | Hinton et al. | |
| 2006/0182029 | A1 * | 8/2006 | Kealy et al. | 370/230 |
| 2006/0236382 | A1 | 10/2006 | Hinton et al. | |
| 2006/0285493 | A1 * | 12/2006 | Manuja et al. | 370/235 |
| 2009/0092050 | A1 * | 4/2009 | Buch et al. | 370/236 |

OTHER PUBLICATIONS

Maler, Eva, "Federated Identity Management", http://www.idealliance.org/proceedings/xml05/ship/177/177-maler-fed-id.HTML, Date: 2002.
Norlin, et al., "Ping ID—Federated Identity Management", Date: 2002, pp. 1-15.
Zugic, Goran, "ebXML and Federated Enterprise Reference Architecture (EFERA)", Date: Jul. 21, 2003, pp. 1-7.

* cited by examiner

*Primary Examiner* — Cordelia Zecher

(57) ABSTRACT

Techniques to protect from open enhanced federation user enumeration are described. An apparatus may include a network interface operative to establish connections. The access edge server may further include an open enhanced federation (OEF) module communicatively coupled to the network interface. The OEF module may be operative to manage connections between multiple federated networks. In one embodiment, for example, the OEF module may comprise a peer authentication module operative to determine whether a peer making the request is an untrusted peer domain. The OEF module may further comprise a peer tracking module operative to retrieve a total request number and a total limit number associated with the untrusted peer, and compare the total request number with the total limit number to form a threat status indicator value. The OEF module may also comprise a peer authorization module operative to authorize the request based on the threat status indicator value. Other embodiments are described and claimed.

11 Claims, 5 Drawing Sheets

OPEN ENHANCED FEDERATION SECURITY TECHNIQUES

BACKGROUND

Instant Messaging (IM) and presence federation allows users from different enterprises who are federating with each other to share presence information and exchange instant messages. It may be desirable to establish the federated link as automatically and seamlessly as possible to extend the productivity benefits of the IM and presence features beyond the limits of the enterprise network. The method for automatically allowing federation between enterprises without specific configuration is called Open Enhanced Federation (OEF), and is accomplished by using Domain Name System (DNS) records to locate a peer and cryptographic certificates to prove that a peer's identity matches expected values for the enterprise they are claiming to represent. This should be accomplished in a secure manner. One of the risks for an enterprise when federating, however, is having increased security concerns, such as an unknown federated party performing a directory attack on the local enterprise directory. An example of a possible directory attack is to send requests not displayed to end users to certain user names and attempt to determine if the user names are valid or not in the enterprise. This may be based on differences in the responses. Such an attack could be used to target valid users with unsolicited Voice Over Internet Protocol (VoIP) calls, electronic mails (emails) and instant messages.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments may be generally directed to a communications system. Some embodiments may be particularly directed to a communications system comprising multiple federated enterprise networks to provide various real-time communications services such as IM. Each federated enterprise network may include an access edge server to control access to the federated enterprise network. The access edge server may be arranged to facilitate open communications between the federated enterprise networks while potentially reducing security threats from unknown or untrusted federated users or devices.

In one embodiment, for example, an apparatus such as an access edge server for a federated enterprise network may include a network interface operative to establish instant messaging connections. The access edge server may further include an open enhanced federation (OEF) module communicatively coupled to the network interface. The OEF module may be operative to manage connections between multiple federated networks. In one embodiment, for example, the OEF module may comprise a peer tracking module operative to retrieve a total number of internal user names contacted and a total limit number associated with the peer, and compare the total number of internal user names contacted with the total limit number to form a threat status indicator value. The OEF module may also comprise a peer authorization module operative to authorize requests based on the threat status indicator value. In this manner, a federated enterprise network may automatically and seamlessly extend the productivity benefits of the IM and presence features beyond the limits of the federated enterprise network, while improving measures against possible security threats. Other embodiments are described and claimed.

DETAILED DESCRIPTION

Various embodiments may comprise one or more elements. An element may comprise any feature, characteristic, structure or operation described in connection with an embodiment. Examples of elements may include hardware elements, software elements, physical elements, or any combination thereof. Although an embodiment may be described with a limited number of elements in a certain arrangement by way of example, the embodiment may include more or less elements in alternate arrangements as desired for a given implementation. It is worthy to note that any references to "one embodiment" or "an embodiment" or similar language are not necessarily referring to the same embodiment.

Various embodiments may be directed to a communications system comprising multiple federated enterprise networks to provide various real-time communications services such as IM. Each federated enterprise network may include an access edge server to control access to the federated enterprise network. The access edge server may be arranged to facilitate open communications between the federated enterprise networks while potentially reducing security threats from unknown or untrusted federated users or devices. This may be accomplished, for example, by implementing an open enhanced federation (OEF) module as part of the access edge server. The OEF module may be arranged to monitor and limit the number of connections made to internal clients within its federated enterprise network by external federated entities. Limiting the number of internal clients accessible to an external federated entity permits legitimate but unknown federated entities to access services offered by a federated enterprise network, while limiting or reducing the amount of exposure the federated enterprise network has to security threats from malicious federated entities. In this manner, a federated enterprise network may automatically and seamlessly extend the productivity benefits of the IM and presence features beyond the limits of the federated enterprise network, while improving measures against possible security threats.

Figure 1:
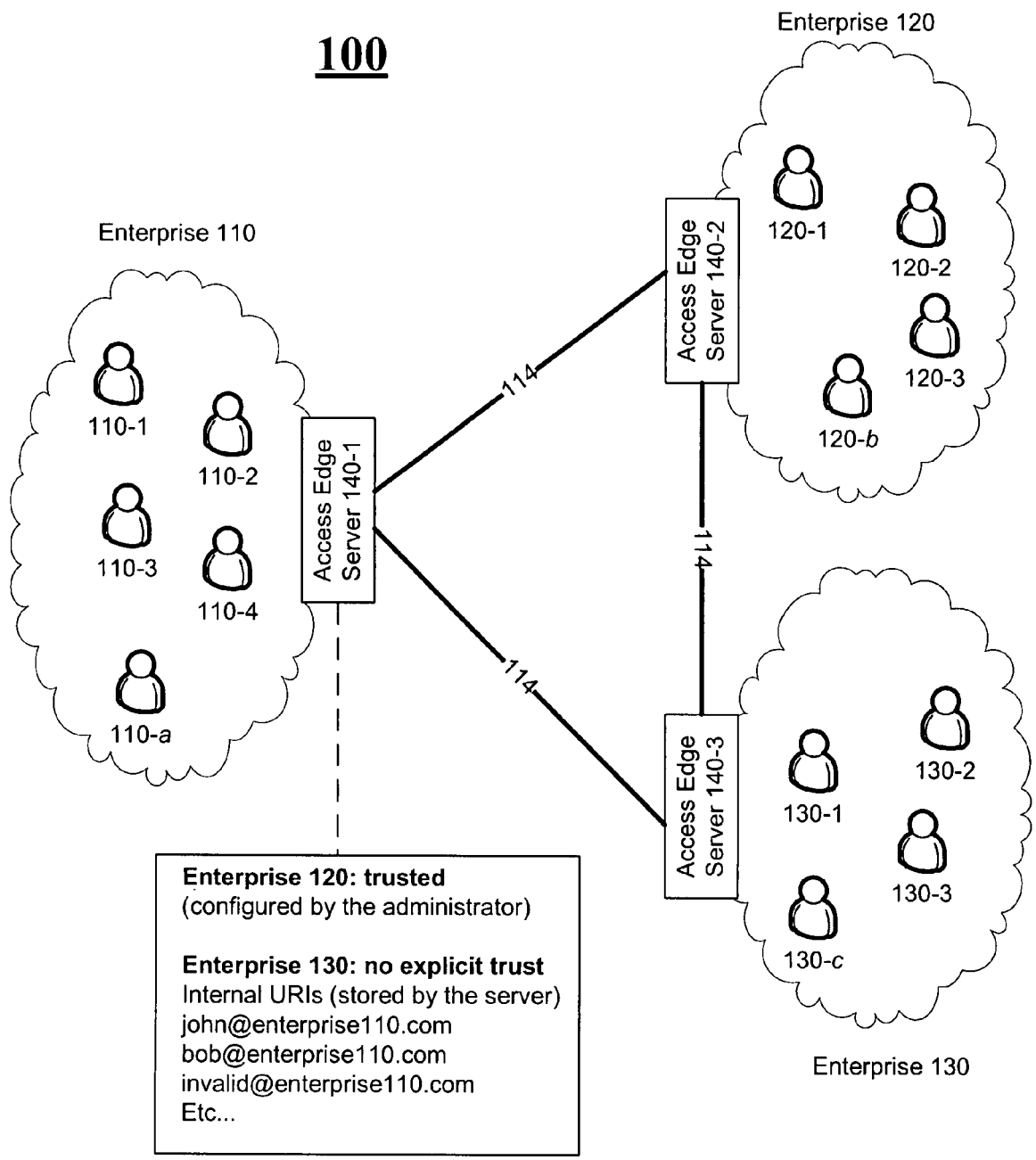
FIG. 1 illustrates one embodiment of a communications system.

FIG. 1 illustrates a block diagram of a communications system 100. In various embodiments, the communications system 100 may be implemented as a wireless communication system, a wired communication system, or a combination of both. When implemented as a wireless communication system, communications system 100 may include components and interfaces suitable for communicating over wireless communications media, such as one or more antennas, transmitters, receivers, transceivers, amplifiers, filters, control logic, and so forth. An example of the communications media may include a wireless shared media implemented using portions of a wireless spectrum, such as the radio-frequency (RF) spectrum and so forth. When implemented as a wired communications system, communications system 100 may include components and interfaces suitable for communicating over wired communications media, such as input/output (I/O) adapters, physical connectors to connect the I/O adapter with a corresponding wired communications medium, network interfaces, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

As shown in the illustrated embodiment of FIG. 1, the communications system 100 may include multiple federated enterprise networks 110, 120 and 130. The federated enterprise networks 110, 120 and 130 may each comprise respective operators and operator devices 110-1-*a*, 120-1-*b* and 130-1-*c*. The operator or user devices may include any number of electronic and network-accessible components, devices or systems, including computers, personal computers, laptop computers, handheld computers, cellular telephones, Voice over Internet Protocol (VoIP) telephones, servers, VoIP servers, IM servers, presence information servers, unified messaging servers, unified communications servers, workstations, network appliances, consumer electronics, televisions and so forth. The federated enterprise networks 110 may each comprise one or more access edge servers 140-1-*m*, all connected by various wireless or wired communications media 114. Although the communications system 100 is shown in FIG. 1 with a limited number of networks and network equipment in a given topology, it may be appreciated that the communications system 100 may comprise more or less networks and network equipment in a different topology and still fall within the scope of the embodiments.

In various embodiments, federated enterprise networks 110, 120 and 130 may each comprise a service-oriented architecture (SOA) network having users that share a federated identity. Federated identity, or the federation of identity, describes the technologies, standards and use-cases which serve to enable the portability of identity information across otherwise autonomous security domains. Identity federation enables users of one domain to securely access data or systems of another domain seamlessly, and without the need for completely redundant user administration. Federation is enabled through the use of open industry standards and/or openly published specifications, such that multiple parties can achieve interoperability for common use cases. Typical use-cases involve things such as cross-domain, web-based single sign-on, cross-domain user account provisioning, cross-domain entitlement management and cross-domain user attribute exchange. Federated identity techniques may facilitate user-to-user, user-to-application or application-to-application use-case scenarios at both the browser tier and the web services or SOA tier. It can involve high-trust, high-security scenarios as well as low-trust, low security scenarios. It can also involve user-centric use-cases, as well as enterprise-centric use-cases.

The federated enterprise networks 110 may each comprise one or more access edge servers 140-1-*m*, all connected by various wireless or wired communications media 114. The access edge servers 140-1-*m* may manage access to the respective federated enterprise networks 110, 120 and 130. More particularly, the access edge servers 140-1-*m* may manage security operations on behalf of their respective networks to allow users of one domain to securely access data or systems of another domain seamlessly. For example, assume an operator 120-1 of the network 120 desires to communicate with an operator 110-1 of the network 110. To accomplish this, the operator 120-1 must traverse the access edge server 140-1 while adhering to the open federation specifications, standards or policies established for the networks 110, 120 for the various defined use-scenarios.

In one embodiment, for example, one or more of the access edge servers 140-1-*m* may be implemented as a MICROSOFT® OFFICE LIVE COMMUNICATIONS SERVER, made by MICROSOFT CORPORATION, Redmond, Wash. The MICROSOFT OFFICE LIVE COMMUNICATIONS SERVER comprises an enterprise real-time communications server. The MICROSOFT OFFICE LIVE COMMUNICATIONS SERVER is designed to manage and facilitate communications between various client applications implemented by the operators 110-1-*a*, 120-1-*b* and 130-1-*c*. For example, the MICROSOFT OFFICE LIVE COMMUNICATIONS SERVER may be arranged to provide IM and collaboration functionality between client applications such as MICROSOFT WINDOWS® MESSENGER or MICROSOFT OFFICE COMMUNICATOR CLIENT.

In various embodiments, the access edge servers 140-1-*m* may be arranged to implement various federation policies for the management of IM and collaboration functionality or operations between the federated enterprise networks 110, 120 and 130. The federated enterprise networks 110, 120 and 130 may each provide various IM and collaboration services to clients within their own domains. Such IM and collaboration functionality or operations may include presence information, application sharing, file transfer and voice and video communication. Some or all of these features are often not possible even within a single network using public IM clients, however, due to the effects of negotiating the corporate firewall and Network Address Translation (NAT) services. By implementing IM and presence federation through the federation policies, the access edge servers 140-1-*m* may interoperate with other corporate IM networks to allow federated users from cross-domains to share presence information and exchange instant messages.

The particular federation policy implemented by the access edge servers 140-1-*m* should be designed to establish the federated link as automatically and seamlessly as possible to extend the productivity benefits of the IM and presence features beyond the limits of a single enterprise network. The federated links, however, should be established in a secure manner. There are a number of security threats to federated networks. For example, the federated enterprise networks 110, 120 and 130 may be subject to Denial of Service (DoS) attacks at the Session Initiation Protocol (SIP) level, the enumeration of enterprise users, messaging spam comprising unsolicited and likely automated instant messages targeting users of IM services, and so forth. The access edge servers 140-1-*m* may handle DoS attacks by implementing rate limitation features for public users, such as limiting traffic to 20 messages per second, for example. The enumeration of enterprise users, however, may require other security features other than rate limitation.

User enumeration or a directory attack is a process where an attacker uses the SIP protocol to ascertain valid uniform resource identifiers (URIs) in an enterprise. This can be done for a number of reasons including discovery or verification. Discovery means that an attacker is attempting to create a list of valid URI in an enterprise. This may be done to perform further attacks. Verification is where an attacker has a list of the enterprise URI and wants to verify that they are still valid. Both of these attacks are characterized by the attacker communicating with a larger number of users and in the case of discovery a very large number of users.

Various embodiments are designed to address these and other security threats to federation enterprise networks. This can be accomplished by limiting the number of users a known federated party can communicate within a given federated enterprise network 110, 120 or 130. For example, a first enterprise user of a first federated enterprise network may attempt to connect to one or more enterprise URIs of a second federated enterprise network. If the first enterprise is not explicitly trusted by the second federated enterprise network (e.g., they are not explicitly configured by the administrator of the second federated enterprise network), the first enterprise should only be able to communicate with a limited number of enterprise URIs from the second federated enterprise network in a given time period. Once the users of the first federated enterprise network exceeds the limited number of enterprise URIs allowed for the second federated enterprise network within the given time period, the users of the first federated enterprise network should not be able reach any more enterprise URIs of the second federated enterprise network. This limitation can be removed by the administrator of the second federated enterprise network by signaling to the access edge server 140-1-$m$ that the first federated enterprise network can be trusted. Similarly, an enterprise administrator may determine that it no longer wants to federate with another enterprise because of suspicious traffic.

Placing a limit on the number of enterprise URIs from one domain that can be contacted by another enterprise domain has several advantages. For example, a legitimate federated enterprise has the ability to establish a federated link with another federated enterprise and vice-versa. In another example, a malicious federated enterprise user which intends to perform a directory attack would only be able to perform a limited attack with reduced risks.

Each federated enterprise network 110, 120 and 130 may include respective access edge servers 140-1, 140-2 and 140-3 to control access to its federated enterprise network. The access edge servers 140 may be arranged to facilitate open communications between the federated enterprise networks while potentially reducing security threats from unknown or untrusted federated users or devices. The communications system 100 in general, and the access edge servers 140-1, 140-2 and 140-3 in particular, may be described in more detail with reference to FIGS. 2-5.

Figure 2:
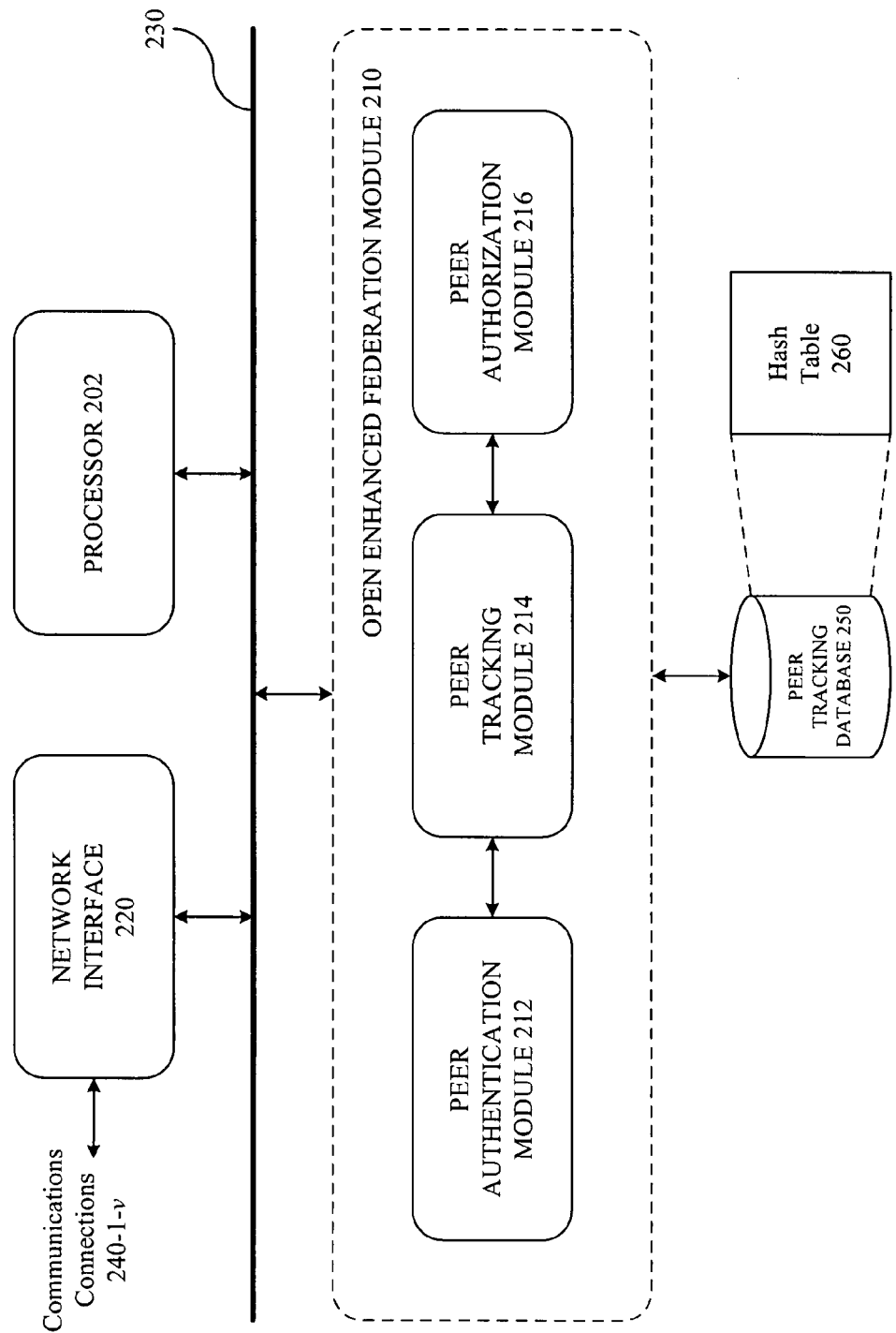
FIG. 2 illustrates one embodiment of an access edge server.

FIG. 2 illustrates one embodiment of an access edge server 140. The access edge server 140 may be representative of, for example, one or more of the access edge servers 140-1, 140-2 and 140-3. As shown in FIG. 2, the access edge server 140 for a federated enterprise network 110, 120 or 130 may include a network interface 220 operative to establish multiple communications connections 240-1-$v$. The communications connections 240-1-$v$ may represent any logical or physical connections between enterprises or peers to communication information, including control information and media information. Examples of communications connections 240-1-$v$ may include IM connections, VoIP connections, presence information connections, email connections, chat connections, pager connections, and so forth. In one embodiment, for example, the network interface 220 may be operative to establish multiple instant messaging connections 240-1-$v$. Although some embodiments may describe one type of connection comprising instant messaging connections 240-1-$v$ by way of example and not limitation, it may be appreciated that other connections may also be established and still fall within the scope of the embodiments.

The access edge server 140 may further include an open enhanced federation (OEF) module 210 communicatively coupled to the network interface 220. The OEF module 210 may be operative to manage communications connections 240-1-$v$ between multiple federated clients 110-1-$a$, 120-1-$b$ and 130-1-$c$ and multiple federated networks 110, 120 and 130. More particularly, the OEF module 210 may be used to implement various security techniques to reduce security threats between federated enterprise networks 110, 120 and 130. For example, the OEF module 210 may operate to limit the number of communications connections 240-1-$v$ to unique URIs within a given federated enterprise network from another federated enterprise network or individual clients within another federated enterprise network. In some cases, the OEF module 210 may collectively treat an entire federated enterprise network 110, 120 or 130 as a peer, including all the individual entities within a given federated enterprise network, such as respective operators 110-1-$a$, 120-1-$b$ or 130-1-$c$. In this use scenario, for example, all of the operators 110-1-$a$ will be treated as a single trusted or untrusted entity, all of the operators 120-1-$b$ will be treated as a single trusted or untrusted entity, and all of the operators 130-1-$c$ will be treated as a single trusted or untrusted entity. In other cases, however, the OEF module 210 may individually treat each operator from a given federated enterprise network as an individual peer (e.g., 110-1 as a first peer, 110-2 as a second peer, and so forth). The embodiments are not limited in this context.

In one embodiment, for example, the OEF module 210 may comprise a peer authentication module 212. The peer authentication module 212 may be operative to determine whether a peer making the request is trusted peer or untrusted peer. A trusted peer may comprise a peer that is known to the peer authentication module 212. The peer authentication module 212 may retrieve a set of privileges associated with the trusted peer, and process requests from the trusted peer in accordance with the trusted privilege rules. An untrusted peer may comprise a peer that is unknown to the peer authentication module 212. The peer authentication module 212 may retrieve a set of privileges associated with untrusted peers, and process requests from the untrusted peer in accordance with the untrusted privilege rules. In many cases, the trusted privilege rules provide greater access to network services than the untrusted privilege rules. In some cases, the peer authentication module 212 may allow an untrusted peer to become a trusted peer over some period of time based on the behavior of the untrusted peer. For example, the peer authentication module may be operative to determine the untrusted peer is a trusted peer when a threat status indicator value associated with the untrusted peer comprises a value greater than zero after expiration of a defined time period, as discussed in more detail below.

For example, assume the federated enterprise networks 110, 120 are configured to allow for open federation. This means that any operator 110-1-$a$, 120-1-$b$ are able to communicate with any other operators that are part of a federated enterprise network that allows open federation as well. Further assume the peer authentication module 212 for the access edge server 140-1 of the federated enterprise network 110 has the federated enterprise network 120 marked, annotated or listed as a trusted peer network. In this case, when an operator 120-1-$b$ from the federated enterprise network 120 requests access to network services provided by the federated enterprise network 110, such as an IM connection 240-1-$v$, the peer authentication module 212 may engage in authentication operations to verify the identify of the operator 120-1-$b$ from the network 120. Once authenticated, the peer tracking module 212 may determine that the operator 120-1-$b$ is from the trusted peer network 120. The OEF module 210 may then establish the requested connection 240-1-$v$ with the appropriate operator 110-1-$a$ from the federated enterprise network 110.

Continuing with this example, assume the federated enterprise network 130 is also configured to allow for open federation. Further assume the peer authentication module 212 for the access edge server 140-1 of the federated enterprise network 110 has the federated enterprise network 130 marked, annotated or listed as an untrusted peer network. In this case, when an operator 130-1-c from the federated enterprise network 130 requests access to network services provided by the federated enterprise network 110, such as an IM connection 240-1-v, the peer authentication module 212 may engage in authentication operations to verify the identify of the operator 130-1-c from the network 130. Once authenticated, the peer tracking module 212 may determine that the operator 120-1-c is from the untrusted peer network 130. The untrusted peer network 130, however, may be a potentially valuable federated partner, and therefore the OEF module 210 may not want to simply deny all requests from the untrusted peer network 130. On the other hand, the OEF module 210 may not automatically grant the untrusted peer network 130 with the same level of privileges granted to a trusted peer network such as the trusted peer network 120, since one or more operators 130-1-c of the untrusted peer network 130 may be attempting to compromise security for the federated enterprise network 110. For example, an operator 130-1-c may attempt a DoS attack or directory attack. Consequently, prior to granting the request for the communications connection 240-1-v, the peer tracking module 212 may need to pass the request to other elements of OEF module 210 for further security processing.

In one embodiment, for example, the OEF module 210 may further comprise a peer tracking module 214. The peer tracking module 214 may be operative to retrieve a total request number and a total limit number associated with the untrusted peer. The peer tracking module 214 may compare the total request number with the total limit number to form a threat status indicator value. The threat status indicator value may be used to determine whether the OEF module 210 should grant or deny a request for a communications connection 240-1-v from an untrusted peer.

The peer tracking module 214 may be operative to retrieve a total request number and a total limit number associated with an untrusted peer. The total request number may represent a number of unique URIs contacted by requests made by an untrusted peer within a certain time period. The total limit number may represent a number of unique URIs contacted by requests allowed for a given untrusted peer within a certain time period. The total limit number may be stored as a DWORD such as MaximumOEFcontacts, for example, with a default limit threshold value (e.g., 1000) and potentially a disable value (e.g., zero). The defined time period for the total limit number may be stored as a DWORD such as OEFContactTrackingTTL, for example, with a default time period threshold value. For example, the default time period threshold value may comprise a value of 0x93A0, which represents 604800 seconds or one week.

The peer tracking module 214 may count a number of requests from a peer to a unique uniform resource identifiers (URIs) to form the total request number. This may include both valid and invalid URIs. The latter URIs may be particularly valuable information since it catches directory attacks involving guessing where the attacker is more likely to be wrong than right when trying URIs. The peer tracking module 214 may associate the total request number with a given untrusted peer, and update the total request number for each new request from the associated peer for a new connection 240-1-v to a unique URI.

The peer tracking module 214 may compare the total request number with the total limit number to form a threat status indicator value. The threat status indicator value may represent a level of threat for a given unknown or untrusted peer. For example, assume the total request number for an untrusted peer 130-1 was 995 attempts, and the total limit number for the untrusted peer 130-1 was 1000 attempts. In this case, the threat status indicator value would be the value of five (5). Under this formulation, the higher the threat status indicator the less the OEF module 210 would consider the untrusted peer 130-1 a threat, and the lower the threat status indicator the more the OEF module 210 would consider the untrusted peer 130-1 a threat. For example, if over time the untrusted peer 130-1 made 1000 attempts, then the threat status indicator value would be a value of zero (0). Once this limit has been hit, the OEF module 210 may then block all further new URIs. At this point, the OEF module 210 may consider the untrusted peer 130-1 a serious threat, and begin monitoring the untrusted peer 130-1 more closely to determine whether the untrusted peer 130-1 is engaging in any illicit or unauthorized behavior. The peer tracking module 214 may maintain and update a threat status indicator value for each untrusted peer, and output or store the threat status indicator value for use by the peer authorization module 216 to determine whether the OEF module 210 should grant or deny a request for a connection 240-1-v from an untrusted peer.

At some point, the OEF module 210 may consider an untrusted peer an increased security threat, and begin monitoring the untrusted peer more closely to determine whether the untrusted peer is engaging in any illegal or unauthorized behavior. For example, the peer tracking module 214 may associate a threat watch indicator with the untrusted peer when a total request number is equal to or greater than a total limit number. The OEF module 210 may maintain a list of untrusted peer having threat watch indicators, and perform enhanced security analysis and enable stronger security measures based on the behavior of the untrusted peers.

It is worthy to note that although the threat status indicator value may be assigned a specific value for purposes of granularity, it may be appreciated that other techniques may be used to indicate that the limit threshold for a peer has been reached. For example, a simple binary flag may be set to indicate TRUE or FALSE conditions for the OEF module 210.

Rather than blocking all new URIs once the defined limit for an enterprise has been hit, the administrator may also use the limit threshold as a potential indicator that the peer has a legitimate relationship to the enterprise. In this case, the administrator may evaluate whether the peer should be configured as trusted by the administrator.

In various embodiments, the peer tracking module 214 may maintain the total request number and the total limit number using a peer tracking database 250. In one embodiment, the peer tracking database 250 may be operative to store the total request number and the total limit number. The total request number may be stored as a counter. The peer tracking module 214 may determine whether to increment the total request number counter using a hash table 260. In one embodiment, for example, the hash table 260 may be implemented as a fixed size hash table 260. Using this technique of storing the hash rather than the URI prevents an attacker using long URIs to perform a state loading attack. A state loading attack may involve a scenario where the attacker attempts to make the victim use unnecessary amounts of storage.

The hash table 260 may be used to map a hash value into a number of buckets via a transformation algorithm. An example of a transformation algorithm may comprise:

Index=HashKey modulo HashTableSize

The Index may then be used to identify a bucket which contains the HashKey and a timestamp for when the entry was added. If multiple entries match to the same bucket, a probing algorithm may be used to attempt a match or insert an entry. Requests on the external edge of the access point will be checked against the hash table 260 and count against the limit if added. If the entry is present the timestamp in the bucket will be updated. If the limit is not exceeded, then a new entry may be added.

More particularly, the peer tracking module 214 will count a number of requests based on new hash table buckets hit. If a request hashes to an existing bucket that is already marked, the peer tracking module 214 will not increment the corresponding total request number counter. If the hash is to an empty bucket, the peer tracking module 214 will increment the total request number counter and mark the bucket. If the hash is to an empty bucket and the total request number counter is above the total limit number threshold, the connection request will be refused.

In some cases, the peer tracking module 214 may reset the total request number counter periodically without necessarily assigning the peer a trusted status, which is a natural extension without asserting trust. The peer tracking module 214 may also send some interactive feedback via a user interface or graphic user interface (GUI) to a user of interest to let them know when "new" untrusted peers show up, or tracking this list for manual administrative changes.

The peer tracking module 214 may perform routine maintenance for the hash table 260. For example, the peer tracking module 214 may periodically scan the hash table 260 looking for expired entries and removing them. This may be accomplished at any desired periodic interval, such as every 15 minutes. When the last acceptable entry is stored in the hash table 260, the peer tracking module 214 may scan the hash table 260 as well. The peer tracking module 214, however, may not want to perform maintenance operations for the hash table 260 once the limit threshold for an untrusted peer has been reached, since the untrusted peer may force the OEF module 210 to perform undesired work.

In one embodiment, for example, the OEF module 210 may also comprise a peer authorization module 216. The peer authorization module 216 may be operative to authorize the request based on the threat status indicator value. For example, assume the peer tracking module 214 is arranged to derive the threat status indicator value by subtracting the total request number from the total limit number. In this case, the peer authorization module 216 may retrieve the threat status indicator value from the peer tracking database 250 to determine whether to authorize the communications connection 240-1-v. The peer authorization module 216 may deny the request when the threat status indicator value comprises a value equal to zero (0), and grant the request when the threat status indicator value comprises a value greater than zero (0). Stated another way, the peer authorization module 216 may deny the request when the total request number is equal to or greater than a total limit number for the untrusted peer, and grant the request when a total request number is less than a total limit number for the untrusted peer.

Operations for the communications system 100 may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more elements of the communications system 100 or alternative elements as desired for a given set of design and performance constraints.

Figure 3:
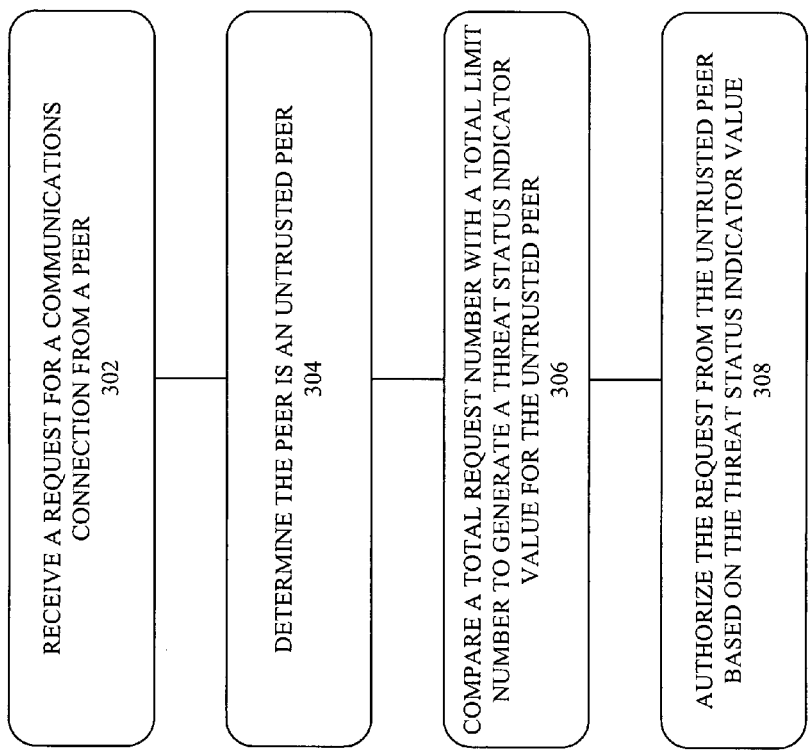
FIG. 3 illustrates one embodiment of a first logic flow.

FIG. 3 illustrates a logic flow 300. Logic flow 300 may be representative of the operations executed by one or more embodiments described herein. As shown in FIG. 3, the logic flow 300 may receive a request for a connection from a peer at block 302. The logic flow 300 may determine the peer is an untrusted peer at block 304. The logic flow 300 may compare a total request number with a total limit number to generate a threat status indicator value for the untrusted peer at block 306. The logic flow 300 may authorize the request from the untrusted peer based on the threat status indicator value at block 308. The embodiments are not limited in this context.

In one embodiment, the logic flow 300 may receive a request for a connection from a peer at block 302. For example, assume the access edge server 140-1 for the federated enterprise network 110 receives a request for a connection 240-1 from the federated enterprise network 130 on behalf of peer 130-1. The request may be passed to the OEF module 210 for security processing.

In one embodiment, the logic flow 300 may determine the peer is an untrusted peer at block 304. From the previous example, assume the OEF module 210 has the federated enterprise network 130 listed as an untrusted peer network in the peer tracking database 250. The peer authentication module 212 may retrieve a peer status indicator associated with the federated enterprise network 130 in general, or the peer 130-1 in particular, and use the peer status indicator to determine that the enterprise 130 is considered an untrusted peer and so are messages from all its clients.

In one embodiment, the logic flow 300 may compare a total request number with a total limit number to generate a threat status indicator value for the untrusted peer at block 306. For example, the peer tracking module 214 may retrieve a total request number and a total limit number associated with the enterprise 130. The peer tracking module 214 may compare the total request number with the total limit number to generate a threat status indicator value for the untrusted enterprise 130. The peer tracking module 214 may store the threat status indicator value computed for the untrusted enterprise 130 in the peer tracking database 250.

In one embodiment, the logic flow 300 may authorize the request from the untrusted peer based on the threat status indicator value at block 308. For example, the peer authorization module 216 may retrieve the threat status indicator value for the untrusted enterprise 130 from the peer tracking database 250. The peer authorization module 216 may evaluate the threat status indicator value for the untrusted enterprise 130 to determine how to respond to the request. For example, the peer authorization module 216 may be arranged to deny the request when the threat status indicator value comprises a value equal to zero (0). The peer authorization module 216, however, may grant the request when the threat status indicator value comprises a value greater than zero (0), such as a positive integer.

Figure 4:
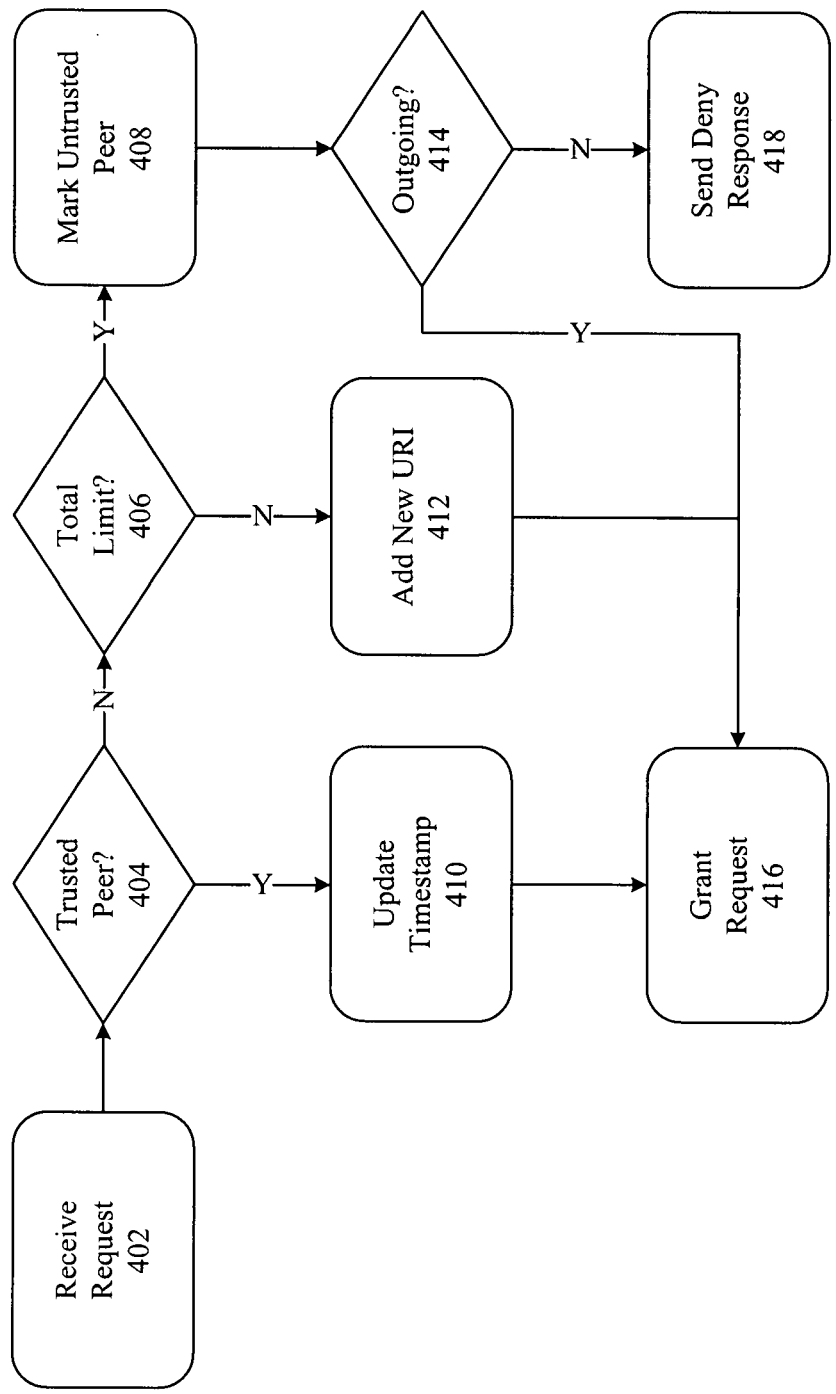
FIG. 4 illustrates one embodiment of a second logic flow.

FIG. 4 illustrates a logic flow 400. Logic flow 400 may be representative of the operations executed by one or more embodiments described herein. As shown in FIG. 4, the logic flow 400 may receive a request for a connection 240-1-v by an access edge server 140-1 at block 402. The peer authentication module 212 may authenticate the requesting peer, and may determine whether the URI of the requesting peer is a trusted peer or an untrusted peer at diamond 404. If the requesting peer is determined to be a trusted peer at diamond 404, such as from one or more operators 120-1-b from the federated enterprise network 120, then the timestamp for the trusted peer may be updated at block 410, and the request is granted at block 416.

If the requesting peer is determined to be an untrusted peer at diamond 404, such as from one or more operators 130-1-c from the federated enterprise network 130, then comparison and threat status indicator value generation operations are performed at diamond 406. The peer tracking module 214 may retrieve a total request number and a total limit number for the requesting peer from the peer tracking database 250 at diamond 406, and compare the total request number with the total limit number to determine whether the requesting peer is below the limit threshold assigned to it. If the requesting peer is determined to be below the limit threshold assigned to it at diamond 406, then the new URI is added to the list of URIs maintained for the requesting peer in the peer tracking database 250 at block 412, and the request is granted at block 416.

If the requesting peer is determined to be at or above the limit threshold assigned to it at diamond 406, then the requesting peer is marked as suspicious at block 408. For example, a threat watch indicator may be assigned to the requesting peer for further security processing. When the limit on URIs is hit by a requesting peer, the requesting peer will be marked for inclusion in a list of suspicious peers in stored in a Windows Management Instrumentation (WMI) store the next time it is scheduled to be written. The peers added to this mechanism will be "potentially suspicious" as they could be a peer that is eventually trusted. If the requesting peer is rate limited due to bad traffic as well, however, then the requesting peer may be considered "highly suspicious."

In some cases, the peer authorization module 216 may periodically or on demand analyze any result codes and corresponding messages in more detail once the peer tracking module 214 has assigned a threat watch indicator to a given peer. The peer authorization module 216 can periodically, or in response to some defined events, analyze the traffic flowing over discovered (untrusted) peers and be prepared to offer administrators a recommendation or at data when the remote federated enterprise network will be blocked. The administrator may then determine whether to permanently configure the remote federated enterprise network as blocked, or enable them as trusted based on an expectation of interaction level with the partner and the quality/type of data that has been passed.

The logic flow 400 determines whether the request is an incoming request or an outgoing request at diamond 414. If the request is an outgoing request, such as from a peer 110-1 to a peer 130-1, then the request is granted at block 416. If the request is an incoming request, such as from a peer 130-1 to a peer 110-1, then the request is denied and a response (e.g., 403 Forbidden Response) is sent at block 418. One reason to send outgoing responses is to avoid implementing security policies at the peer level. By not limiting traffic from within the protected federated enterprise network (e.g., 110) to an untrusted peer, then all the clients within the protected federated enterprise network (e.g., 110-1-a) may be allowed to send traffic to an untrusted peer and its clients, but may not receive traffic from the untrusted peer and its clients once it exceeds its limit threshold.

In some cases, the outgoing requests may still be counted against the untrusted peer. For example, the OEF module 210 may receive a request for a connection 240-1-v from a protected peer internal to the protected federated enterprise network to an untrusted peer edge server. The peer authorization module 216 may detect the outgoing request, and grant the request for the connection. The peer tracking module 214, may then add the request to the total request number associated with the untrusted peer. Counting outgoing requests against an untrusted peer may capture those scenarios where a virus has infected a protected peer to cause the protected peer from performing a reverse directory attack.

Figure 5:
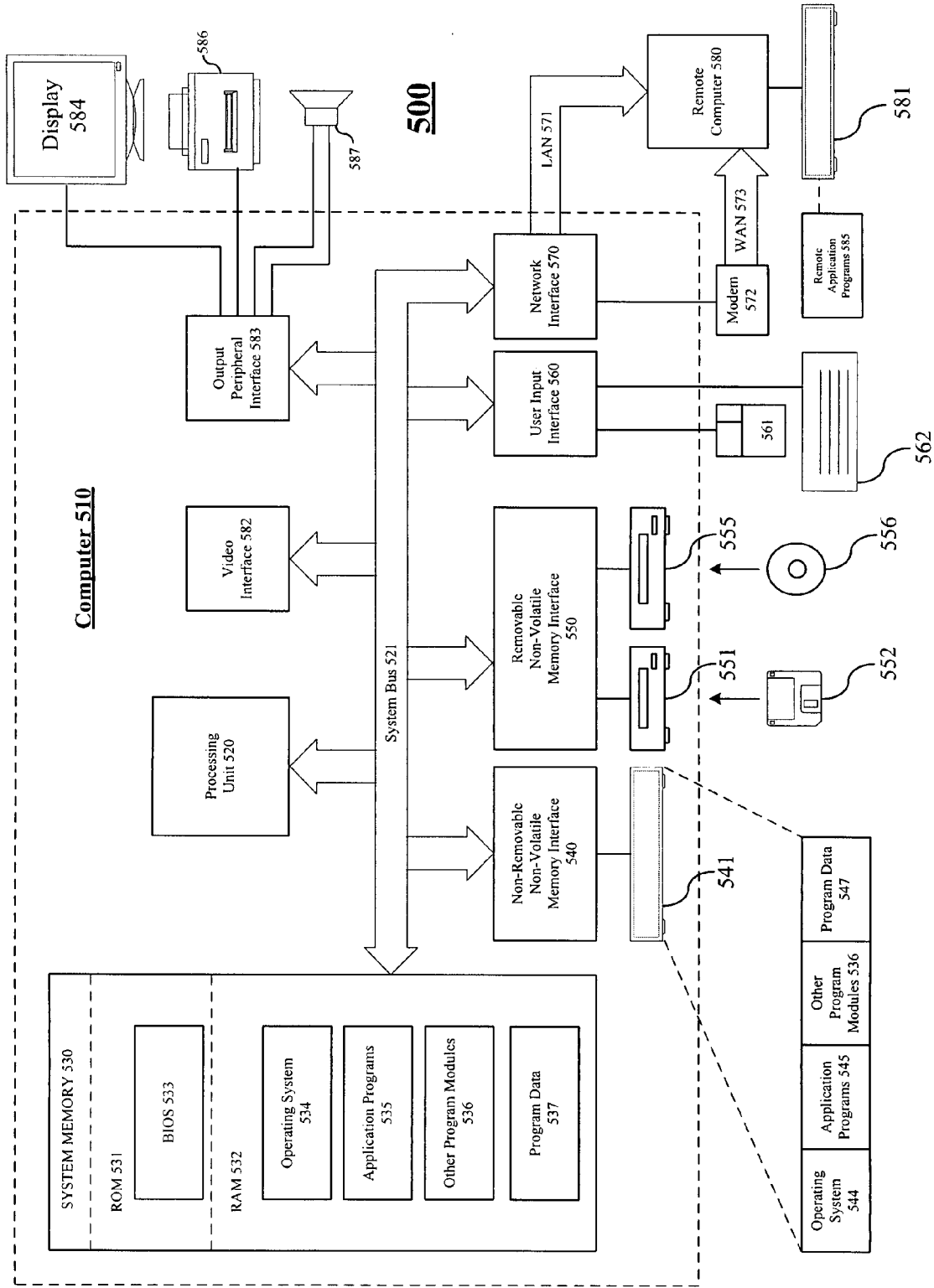
FIG. 5 illustrates one embodiment of a computing system architecture.

FIG. 5 illustrates a block diagram of a computing system architecture 500 suitable for implementing various embodiments, including various elements of the communications system 100, such as the ECM 112 of the wireless device 110, for example. It may be appreciated that the computing system architecture 500 is only one example of a suitable computing environment and is not intended to suggest any limitation as to the scope of use or functionality of the embodiments. Neither should the computing system architecture 500 be interpreted as having any dependency or requirement relating to any one or combination of components illustrated in the exemplary computing system architecture 500.

Various embodiments may be described in the general context of computer-executable instructions, such as program modules, being executed by a computer. Generally, program modules include any software element arranged to perform particular operations or implement particular abstract data types. Some embodiments may also be practiced in distributed computing environments where operations are performed by one or more remote processing devices that are linked through a communications network. In a distributed computing environment, program modules may be located in both local and remote computer storage media including memory storage devices.

As shown in FIG. 5, the computing system architecture 500 includes a general purpose computing device such as a computer 510. The computer 510 may include various components typically found in a computer or processing system. Some illustrative components of computer 510 may include, but are not limited to, a processing unit 520 and a memory unit 530.

In one embodiment, for example, the computer 510 may include one or more processing units 520. A processing unit 520 may comprise any hardware element or software element arranged to process information or data. Some examples of the processing unit 520 may include, without limitation, a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processing unit 520 may be implemented as a general purpose processor. Alternatively, the processing unit 520 may be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), an application specific integrated circuit (ASIC), and so forth. The embodiments are not limited in this context.

In one embodiment, for example, the computer 510 may include one or more memory units 530 coupled to the processing unit 520. A memory unit 530 may be any hardware element arranged to store information or data. Some examples of memory units may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), EEPROM, Compact Disk ROM (CD-ROM), Compact Disk Recordable (CD-R), Compact Disk Rewriteable (CD-RW), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk (e.g., floppy disk, hard drive, optical disk, magnetic disk, magneto-optical disk), or card (e.g., magnetic card, optical card), tape, cassette, or any other medium which can be used to store the desired information and which can accessed by computer 510. The embodiments are not limited in this context.

In one embodiment, for example, the computer 510 may include a system bus 521 that couples various system components including the memory unit 530 to the processing unit 520. A system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and so forth. The embodiments are not limited in this context.

In various embodiments, the computer 510 may include various types of storage media. Storage media may represent any storage media capable of storing data or information, such as volatile or non-volatile memory, removable or non-removable memory, erasable or non-erasable memory, writeable or re-writeable memory, and so forth. Storage media may include two general types, including computer readable media or communication media. Computer readable media may include storage media adapted for reading and writing to a computing system, such as the computing system architecture 500. Examples of computer readable media for computing system architecture 500 may include, but are not limited to, volatile and/or nonvolatile memory such as ROM 531 and RAM 532. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio-frequency (RF) spectrum, infrared and other wireless media. Combinations of the any of the above should also be included within the scope of computer readable media.

In various embodiments, the memory unit 530 includes computer storage media in the form of volatile and/or non-volatile memory such as ROM 531 and RAM 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/nonvolatile computer storage media. By way of example only, FIG. 5 illustrates a hard disk drive 540 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 584 or other type of display device is also connected to the system bus 521 via an interface, such as a video processing unit or interface 582. In addition to the monitor 584, computers may also include other peripheral output devices such as speakers 587 and printer 586, which may be connected through an output peripheral interface 583.

The computer 510 may operate in a networked environment using logical connections to one or more remote computers, such as a remote computer 580. The remote computer 580 may be a personal computer (PC), a server, a router, a network PC, a peer device or other common network node, and typically includes many or all of the elements described above relative to the computer 510, although only a memory storage device 581 has been illustrated in FIG. 5 for clarity. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other technique suitable for establishing communications over the WAN 573, such as the Internet. The modem 572, which may be internal or external, may be connected to the system bus 521 via the network interface 570, or other appropriate mechanism. In a networked environment, program modules depicted relative to the computer 510, or portions thereof, may be stored in the remote memory storage device. By way of example, and not limitation, FIG. 5 illustrates remote application programs 585 as residing on memory device 581. It will be appreciated that the network connections shown are exemplary and other techniques for establishing a communications link between the computers may be used. Further, the network connections may be implemented as wired or wireless connections. In the latter case, the computing system architecture 500 may be modified with various elements suitable for wireless communications, such as one or more antennas, transmitters, receivers, transceivers, radios, amplifiers, filters, communications interfaces, and other wireless elements. A wireless communication system communicates information or data over a wireless communication medium, such as one or more portions or bands of RF spectrum, for example. The embodiments are not limited in this context.

Some or all of the communications system 100 and/or computing system architecture 500 may be implemented as a part, component or sub-system of an electronic device. Examples of electronic devices may include, without limitation, a processing system, computer, server, work station, appliance, terminal, personal computer, laptop, ultra-laptop, handheld computer, minicomputer, mainframe computer, distributed computing system, multiprocessor systems, processor-based systems, consumer electronics, programmable consumer electronics, personal digital assistant, television, digital television, set top box, telephone, mobile telephone, cellular telephone, handset, wireless access point, base station, subscriber station, mobile subscriber center, radio network controller, router, hub, gateway, bridge, switch, machine, or combination thereof. The embodiments are not limited in this context.

In some cases, various embodiments may be implemented as an article of manufacture. The article of manufacture may include a storage medium arranged to store logic and/or data for performing various operations of one or more embodiments. Examples of storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
receiving a request for an instant messaging connection from a federated client;
determining, by a processor, that the federated client is an untrusted client;
comparing a total request number with a total limit number to generate a threat status indicator value for the untrusted client, the total request number representing a number of unique uniform resource identifiers (URIs) contacted by requests for an instant messaging connection made by the untrusted client, the number of unique URIs comprising both valid and invalid URIs, the total request number formed using a hash table comprising a plurality of buckets, the total request number determined based on a number of buckets to which hash values corresponding to the requests for an instant messaging connection are mapped;
when the threat status indicator value indicates that the total limit number has not been reached, authorizing the request from the untrusted client; and
when the threat status indicator value indicates that the total limit number has been exceeded, associating a threat watch indicator with the untrusted client, adding the untrusted client to a list of suspicious peers based on the threat watch indicator, and performing enhanced security analysis based on behavior of the suspicious peers.

2. The method of claim 1, comprising denying the request when the threat status indicator value comprises a value equal to zero.

3. The method of claim 1, comprising determining the untrusted client is a trusted client when the threat status indicator value comprises a value greater than zero after expiration of a defined time period.

4. The method of claim 1, comprising:
receiving a request for an instant messaging connection to the untrusted client;
granting the request for the instant messaging connection; and
determining whether to increment the total request number associated with the untrusted client, using the hash table.

5. An article of manufacture comprising a machine-readable storage medium, wherein the medium is not a signal, containing instructions that if executed enable a system to:
receive a request for an instant messaging connection from a federated client; determine that the federated client is an untrusted client;
compare a total request number with a total limit number associated with the untrusted client to generate a threat status indicator value for the untrusted client, the total request number representing a number of unique uniform resource identifiers (URIs) contacted by requests for an instant messaging connection made by the untrusted client, the number of unique URIs comprising both valid and invalid URIs, the total request number formed using a hash table comprising a plurality of buckets, the total request number determined based on a number of buckets to which hash values corresponding to the requests for an instant messaging connection are mapped;
when the threat status indicator value indicates that the total limit number has not been reached, authorize the request; and
when the threat status indicator value indicates that the total limit number has been exceeded, associate a threat watch indicator with the untrusted client, add the untrusted client to a list of suspicious peers based on the threat watch indicator, and perform enhanced security analysis based on behavior of the suspicious peers.

6. The article of manufacture of claim 5, further comprising instructions that if executed enable the system to deny the request when the total request number is equal to or greater than the total limit number for the untrusted client.

7. The article of manufacture of claim 5, further comprising instructions that if executed enable the system to determine that the untrusted client is a trusted client when the total request number is lower than the total limit number after expiration of a defined time period.

8. The article of manufacture of claim 5, further comprising instructions that if executed enable the system to:
receive a request for an instant messaging connection to the untrusted client;
grant the request for the instant messaging connection; and
determining whether to increment the total request number associated with the untrusted client, using the hash table.

9. An apparatus, comprising:
a processor;
a network interface operative to establish instant messaging connections;
an open enhanced federation (OEF) module communicatively coupled to the network interface, the OEF module operable by the processor to manage instant messaging connections between multiple federated clients and multiple federated networks, to maintain a list of suspicious peers, and to perform enhanced security analysis based on behavior of the suspicious peers, the OEF module comprising:
a client authentication module operative to determine whether a federated client making the request is an untrusted client;
a client tracking module operative to retrieve a total request number and a total limit number associated with the untrusted client, and compare the total request number with the total limit number to form a threat status indicator value, the total request number representing a number of unique uniform resource identifiers (URIs) contacted by requests for an instant messaging connection made by the untrusted client, the number of unique URIs comprising both valid and invalid URIs, the total request number formed using a hash table comprising a plurality of buckets, the total request number determined based on a number of buckets to which hash values corresponding to the requests for an instant messaging connection are mapped;
a client authorization module operative to authorize the request when the threat status indicator value indicates that the total limit number has not been reached, and to associate a threat watch indicator with the untrusted client and add the untrusted client to the list of suspicious peers based on the threat watch indicator when the threat status indicator value indicates that the total limit number has been exceeded.

10. The apparatus of claim 9, the client authorization module operative to deny the request when the threat status indicator value comprises a value equal to zero.

11. The apparatus of claim 9, the client authentication module operative to determine the untrusted client is a trusted client when the threat status indicator value comprises a value greater than zero after expiration of a defined time period.

* * * * *